United States Patent Office 3,346,638
Patented Oct. 10, 1967

3,346,638
α-PHENYL-2-AMINO-BENZYLMERCAPTANES
Werner Metlesics, Clifton, and Leo Henryk Sternbach, Upper Montclair, N.J., assignors to Hoffmann-La Roche Inc., Nutley, N.J., a corporation of New Jersey
No Drawing. Filed Apr. 2, 1965, Ser. No. 445,248
2 Claims. (Cl. 260—570)

The present invention relates to novel chemical processes and to novel intermediates useful in such novel chemical processes. More particularly, the present invention relates to novel chemical processes useful in the preparation of medicinally valuable 4,1-benzothiazepin-2-ones and to novel intermediates useful to such novel chemical processes.

The novel process aspect of the present invention involves (1) treating a compound of the formula

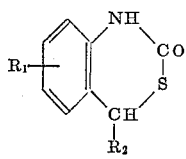
I wherein $R_1$ is selected from the group consisting of hydrogen, halogen, lower alkyl and lower alkoxy; $R_2$ is selected from the group consisting of hydrogen, lower alkyl and

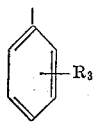

in which $R_3$ is selected from the group consisting of hydrogen and halogen with an aqueous alkaline medium whereby to provide a compound of the formula

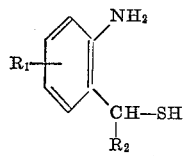
II wherein $R_1$ and $R_2$ are as above and (2) reacting the so-formed compound of Formula II above with a compound of the formula

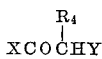

XCOCHY   III wherein $R_4$ is selected from the group consisting of hydrogen and lower alkyl and X and Y are the same or different halogen atoms, preferably, one selected from the group consisting of chlorine and bromine thereby preparing the desired benzothiazepines of the formula

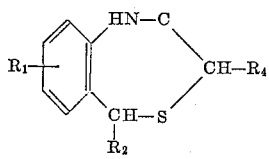
IV wherein $R_1$, $R_2$ and $R_4$ are as above.

Compounds of Formula IV above are useful in the preparation of pharmaceutically valuable compounds as well as being medicinally useful in and of themselves. Such compounds are not new with the present applicants.

The first stage of the above reaction, i.e., the preparation of compounds of Formula II above from compounds of Formula I above, proceeds in the presence of any suitable alkaline aqueous medium. Such a medium may be provided by adding an alkali metal hydroxide such as potassium hydroxide, an alkaline earth metal hydroxide or any suitable basic material, to water. Temperature and pressure are not a critical feature in the initial step of the reaction sequence illustrated above and accordingly, the reaction step can be effected at room temperature and atmospheric pressure or above room temperature and/or at elevated pressures.

The second stage in the novel process described herein above, i.e. the preparation of compounds of Formula IV above from the corresponding compounds of Formula II above is effected in the presence of a basic medium such as an alkali metal hydroxide in water or an alkaline earth metal hydroxide in water. Here again, temperature and pressure are not critical and thus, the reaction can be conducted at any suitable temperature and/or pressure.

In order to secure sufficient solution of the reactants in the second stages of the process of the present invention, an additional solvent which is non-miscible with water, such as an ether, e.g. diethyl ether is preferably present in the reaction medium to, for example, enchance the solubility of the starting materials, i.e., the intermediate of the Formula II and/or the end product.

Compounds of Formula I above can be prepared by a variety of reaction routes. Each of such reaction routes involve the utilization of a compound of the formula

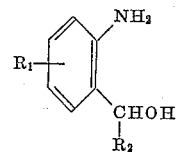
V wherein $R_1$ and $R_2$ are as above.

In one process aspect of the present invention, compounds of Formula V above are reacted with carbon disulfide in the presence of a tertiary amine and any conveniently available suitable organic solvent. Representative of tertiary amines suitable for this purpose is tri-lower alkyl amines such as triethylamine. Illustrative of preferable organic solvents are lower alkanols, such as methanol, ethanol and the like.

The resultant compounds which are of the formula

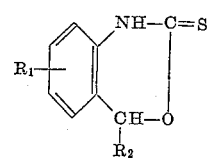
VI wherein $R_1$ and $R_2$ are as above are then heated, preferably at about the melting point thereof, whereby to yield the corresponding compounds of Formula I above.

In yet another route for preparing compounds of Formula I above, compounds of Formula V above are reacted with carbon disulfide in the presence of a suitable alkaline material which may be an alkali metal hydroxide such as potassium hydroxide and the like and any organic solvent such as lower alkanols, e.g. methanol and ethanol and the like which will function advantageously in this aspect of the present invention. The ensuing reaction results in a compound of the formula

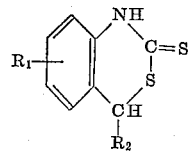
VII wherein $R_1$ and $R_2$ are as above.

The so-formed compounds of Formula VII above are then treated with any suitable oxidizing system which will efficaciously effect the desired end such as one which includes hydrogen peroxide whereby to yield the corresponding compound of Formula I above.

Compounds of Formulas I, II, VI and VII above wherein $R_2$ is a

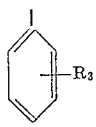

group are novel compounds and are useful in the preparative techniques outlined hereinabove. Thus, they constitute a part of the present invention.

The term "lower alkyl" as utilized throughout the instant disclosure and claims is intended to connote a straight or branched chain hydrocarbon group such as methyl, ethyl, isopropyl, butyl and the like. The term "halogen" as employed hereinabove is intended to designate all four forms thereof, i.e. chlorine, bromine, iodine and fluorine, unless otherwise stated. The expression, "lower alkoxy" as used herein represents a straight or branched chain hydrocarbon group such as methoxy and the like.

In a preferred aspect of the present invention, $R_1$ in compounds of Formula IV above is connected to the fused phenyl ring at either the 7 or the 8 position thereof.

The following examples are illustrative of the present invention, but are not limitative thereof. All temperatures stated are in degrees centigrade unless otherwise indicated.

Example 1

A solution of 25 g. of 2-amino-5-chlorobenzohydrol, 2.5 ml. of triethylamine and 20 ml. of carbondisulfide in 250 ml. of ethanol was heated to reflux for 18 hours. The mixture was concentrated in vacuo until a crystalline precipitate appeared. On cooling, 6-chloro-1,4-dihydro-4-phenyl-2H-3,1-benzoxazine-2-thione as white needles were obtained which after recrystallization from a mixture of methylene chloride and petroleum ether melted at 197–200°.

Example 2

A solution of 117 g. (0.5 mole) of 2-amino-5-chlorobenzohydrol in a mixture of 800 ml. of ethanol, 100 ml. of water, 100 ml. of carbondisulfide and 48 g. of potassium hydroxide was refluxed for 16 hours. It was then filtered and the filtrate concentrated in vacuo to a volume of ca. 200 ml. The so-concentrated filtrate was poured into 2000 ml. of ice water and acidified with hydrochloric acid to a pH of ca. 4–5. A crystalline precipitate was obtained which on recrystallization from a mixture of methylene chloride and petroleum ether gave 6-chloro-1,4-dihydro-4-phenyl-2H-3,1-benzothiazine-2-thione, as white needles melting at 156–159°.

Example 3

To 60 ml. of an aqueous 30% solution of hydrogen peroxide cooled in an ice bath there was added 20 ml. of 5 N aqueous potassium hydroxide. To this solution was added 45 ml. of ethanol and 7.1 g. of 6-chloro-1,4-dihydro-4-phenyl-2H-3,1-benzothiazine-2-thione. The resultant suspension was stirred for 18 hours at room temperature and acidified with dilute hydrochloric acid. A solid precipitated which was collected on a filter. After recrystallization of the precipitate from methanol, there was obtained 6-chloro-1,4-dihydro-4-phenyl-2H-3,1-benzothiazin-2-one as white platelets melting at 209–211°.

Example 4

Distillation of 6-chloro-1,4-dihydro-4-phenyl-2H-3,1-benzoxazine-2-thione in a bulb tube at ca. 0.1 mm. and ca. 200° (bath temperature) gave a white solid, which after recrystallization from a mixture of methylene chloride and ether melted at 209–211°. This compound was found to be 6-chloro-1,4-dihydro-4-phenyl-2H-3,1-benzothiazin-2-one.

Example 5

A solution of 67 g. of 6-chloro-1,4-dihydro-4-phenyl-2H-3,1-benzothiazin-2-one and 5 g. of sodium hydrosulfite ($Na_2S_2O_4$) in 500 ml. of an aqueous 20% solution of potassium hydroxide was refluxed for 4 hours. The mixture was cooled, neutralized with acetic acid and extracted with methylene chloride. The organic phase was washed with water, dried and the solvent was removed in vacuo yielding crude α-phenyl-2-amino-5-chloro-benzylmercaptan as an oil.

Example 6

A solution of 44 g. of the crude mercaptan prepared as in Example 5 in 1050 ml. of ether was shaken with 19.9 ml. of chloroacetyl chloride and 225 ml. of 2 N sodium hydroxide. These reagents were added in turns in small portions so that the aqueous phase remained basic. A solid precipitated which was collected on a filler and after recrystallization of the precipitate from a mixture of methylene chloride and ether yielded 7-chloro-3,5-dihydro-5-phenyl-4,1-benzothiazepin-2(1H)-one as white needles melting at 221–223°.

Example 7

To a suspension of 2.9 g. of 7-chloro-3,5-dihydro-5-phenyl-4,1-benzothiazepin-2(1H)-one, in 125 ml. of methanol was added an aqueous solution of 2.3 g. of sodium periodate. The mixture was stirred for 3 days at room temperature. A precipitate which formed was collected on a filter. The precipitate was recrystallized from a mixture of methylene chloride and methanol to yield 7-chloro-3,5-dihydro-5-phenyl-4,1-benzothiazepin-2(1H)-one 4-oxide as white needles melting at 255–258°.

Example 8

To a solution of 15 g. of 7-chloro-3,5-dihydro-5-phenyl-4,1-benzothiazepin-2(1H)-one in 100 ml. of dimethylformamide, there was added 4.8 g. of a 50% suspension of sodium hydride in mineral oil. The mixture was cooled in an ice bath and 6.3 ml. of methyl iodide was added thereto. The mixture was stirred for 15 minutes and poured into ice water. A solid precipitated which was collected on a filter and after recrystallization from a mixture of methylene chloride and ether yielded 7-chloro-3,5-dihydro-1-methyl-5-phenyl-4,1-benzothiazepin-2(1H)-one as white platelets melting at 173–175°.

Example 9

A solutionn of 1 g. of 7-chloro-1,4-dihydro-4-phenyl-2H-3,1-benzothiazin-2-one and 0.1 g. of sodium hydrosulfite ($Na_2S_2O_4$) in 10 ml. of a 20% aqueous solution of potassium hydroxide was heated to reflux for 2½ hours. The mixture was cooled, neutralized with hydrochloric acid and extracted with methylene chloride yielding α-phenyl-2-amino-4-chloro benzyl mercaptan as an oil. The oil was dissolved in 30 ml. of ether and shaken with 0.25 ml. of chloroacetyl chloride and dilute sodium hydroxide. A solid precipitate formed which after recrystallization from a mixture of methylene chloride and ether gave 8-chloro-3,5-dihydro-5-phenyl-4,1-benzothiazepin-2(1H)-one as white prisms melting at 234–236°.

Example 10

To a solution of 12 g. of 2-amino-4-chlorobenzophenone in 40 ml. of tetrahydrofuran and 30 ml. of ethanol there was added 2.5 g. of sodium borohydride. The mixture was stirred for 16 hours at room temperature, and poured into water. White crystals of 2-amino-4-chlorobenzohydrol melting at 94–96° were obtained. The 2-amino-4-chloro-benzohydrol so obtained, was added to a solution of 4.8 g. of potassium hydroxide in 10 ml. of water and 80 ml. of ethanol. To this solution, 10 ml. of carbon disulfide was added and the mixture was heated to reflux overnight. Concentration in vacuo, neutralization with acetic acid and extraction with methylene chloride gave 7 - chloro - 1,4 - dihydro - 4 - phenyl - 2H - 3,1 - benzothiazin-2-thione as yellow crystals melting at 173–177°.

*Example 11*

An aqueous solution of 9.1 g. of potassium hydroxide was added to 102 ml. of an aqueous 30% solution of hydrogen peroxide cooled in an ice bath. To this mixture was added 11.7 g. of 7-chloro-1,4-dihydro-4-phenyl-2H-3,1-benzothiazin-2-thione and 40 ml. of ethanol. This suspension was stirred for 18 hours at room temperature and acidified with hydrochloric acid. A crystalline precipitate was obtained which still contained starting material and was, therefore, treated again with hydrogen peroxide under the conditions described above. White prisms of 7-chloro - 1,4-dihydro-4-phenyl-2H-3,1-benzothiazin-2-one were obtained which after recrystallization from a mixture of methylene chloride and ether melted at 185–187°.

We claim:
1. A compound of the formula

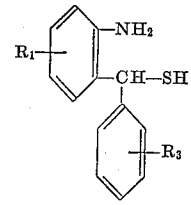

wherein $R_1$ is selected from the group consisting of hydrogen, halogen, lower alkyl and lower alkoxy and $R_3$ is selected from the group consisting of hydrogen and halogen.

2. α-Phenyl-2-amino-5-halo-benzylmercaptan.

References Cited

UNITED STATES PATENTS 2,290,860  7/1942  Burk et al.
2,893,992  7/1959  Sternbach _____ 260—570 X

OTHER REFERENCES

Ruggli et al.: "Chemical Abstracts," vol. 36, pages 85–86 (1942).

CHARLES B. PARKER, *Primary Examiner.*
ROBERT V. HINES, *Assistant Examiner.*

UNITED STATES PATENT OFFICE
CERTIFICATE OF CORRECTION

Patent No. 3,346,638                      October 10, 1967

Werner Metlesics et al.

It is certified that error appears in the above identified patent and that said Letters Patent are hereby corrected as shown below:

Column 1, lines 57 to 63, the right-hand portion of the formula reading

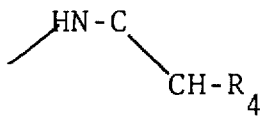 should read 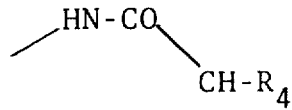

Signed and sealed this 4th day of November 1969.

(SEAL)
Attest:

Edward M. Fletcher, Jr.             WILLIAM E. SCHUYLER, JR.
Attesting Officer                          Commissioner of Patents